United States Patent [19]

Yamamoto et al.

[11] Patent Number: 5,218,404
[45] Date of Patent: Jun. 8, 1993

[54] LENS SHIFT DEVICE FOR A PHOTOGRAPHIC PRINTER

[75] Inventors: Takashi Yamamoto; Yoshio Ozawa, both of Kanagawa, Japan

[73] Assignee: Fuji Photo Film Co., Ltd., Kanagawa, Japan

[21] Appl. No.: 858,880

[22] Filed: Mar. 27, 1992

[30] Foreign Application Priority Data

Apr. 3, 1991 [JP] Japan .................. 3-98247

[51] Int. Cl.⁵ .............................. G03B 27/52
[52] U.S. Cl. ............................ 355/55; 355/63
[58] Field of Search ............. 355/55, 56, 58, 63

[56] References Cited

U.S. PATENT DOCUMENTS

| | | | |
|---|---|---|---|
| 3,996,596 | 12/1976 | Kurtik | 355/55 |
| 4,583,845 | 4/1986 | Lucht et al. | 355/55 |
| 5,006,886 | 4/1991 | Suzuki. | |
| 5,097,289 | 3/1992 | Lucht et al. | 355/55 |

*Primary Examiner*—Monroe H. Hayes
*Attorney, Agent, or Firm*—Sughure, Mion, Zinn, Macpeak & Seas

[57] ABSTRACT

A lens holder is pivotally mounted at its one end on an axle, and is movable up and down along the axle. The lens holder has a fork formed in the other end. The fork and an arched holding member form an oval aperture. A zoom lens is rotatably fitted in the oval aperture, and also is slidable therein in a horizontal direction. When removing the zoom lens from a lens deck, a lens board securely holding the zoom lens is pulled away from the lens deck in a straight line. The zoom lens rotates and slides in the oval aperture while moving along with the pivotal movement of the lens holder. To move the zoom lens into a rest position, the lens holder pivots further about the axle.

13 Claims, 6 Drawing Sheets

LENS SHIFT DEVICE FOR A PHOTOGRAPHIC PRINTER

BACKGROUND OF THE INVENTION

1. Field of the Invention

The present invention relates to a lens shift device for a photographic printer, in which printing lenses are changeable by moving a printing lens into and out of a printing light path.

2. Description of the Related Art

A photographic printer is known from Japanese Laid-open Patent Application No. 2-278248 (corresponding to U.S. Pat. No. 5,006,886), wherein a zoom lens is utilized for printing so as to make prints of a predetermined size from photographic films of relatively small sizes, such as 110 film and 135 film. This is accomplished by changing the focal length of the zoom lens in accordance with the film frame size. On the other hand, when making prints from a film having relatively large frames, such as 120 film, a corresponding fixed focus lens is set in the printing light path in place of the zoom lens.

Generally, printing of full size frames of 135 film (35 mm in width) is required most frequently. For this reason, a lens changing system has been suggested, wherein a zoom lens for printing small size frames is ordinarily mounted in a photographic printer, and when printing 120 film, the zoom lens is removed from a lens deck into a rest position. In its place, a fixed focus lens specific to 120 size is placed in the lens deck.

For example, Japanese Laid-open Utility Model Application No. 1-130108 discloses a printing lens positioning device with a link arm. The link arm consists of a couple of arm portions linked at one end to each other. One end of the link arm is pivotally mounted to a lens deck, whereas the other end of the link arm is mounted to a lens board. A printing lens is mounted on the lens board, such that the printing lens is movable between a lens set position and a rest position by pivoting the link arm.

In the above-described conventional printing lens positioning device, the movable range of the lens board is so wide that it is necessary, for fitting the lens board to the lens deck, not only to orient the lens board to the lens deck, but also to position the lens board properly. Therefore, changing the printing lenses in this conventional device is somewhat cumbersome and laborious. Moreover, the link arm needs a large amount of space for movement.

SUMMARY OF THE INVENTION

In view of the foregoing, an object of the present invention is to provide a printing lens shift device which allows for quick and easy changing of printing lenses.

Another object of the present invention is to provide a printing lens shift device which requires a relatively small space.

To achieve the above objects, the present invention provides a pivotal lens holder having an oval aperture. A printing lens is fitted in the oval aperture in rotatable and horizontally slidable fashion, such that the printing lens slides in the oval aperture while being moved into and out of a lens set position.

According to the present invention, the printing lens can be moved between a lens set position and a rest position solely by pivoting the lens holder. Moreover, this construction requires less space than conventional devices. In order to anchor the printing lens to the lens set position, or to remove the same from the lens set position, it is only necessary to move the printing lens in a straight line. Therefore, it becomes possible to apply a relatively large force to the printing lens when anchoring or removing the printing lens to or from the lens set position. This facilitates the anchoring and removal of the printing lens.

BRIEF DESCRIPTION OF THE DRAWINGS

The above and other objects and advantages of the present invention will become apparent from the following detailed description of the preferred embodiments when read in connection with the accompanying drawings, wherein like reference numerals designate like parts throughout several views, and wherein.

DETAILED DESCRIPTION OF THE PREFERRED EMBODIMENT

Figure 1:
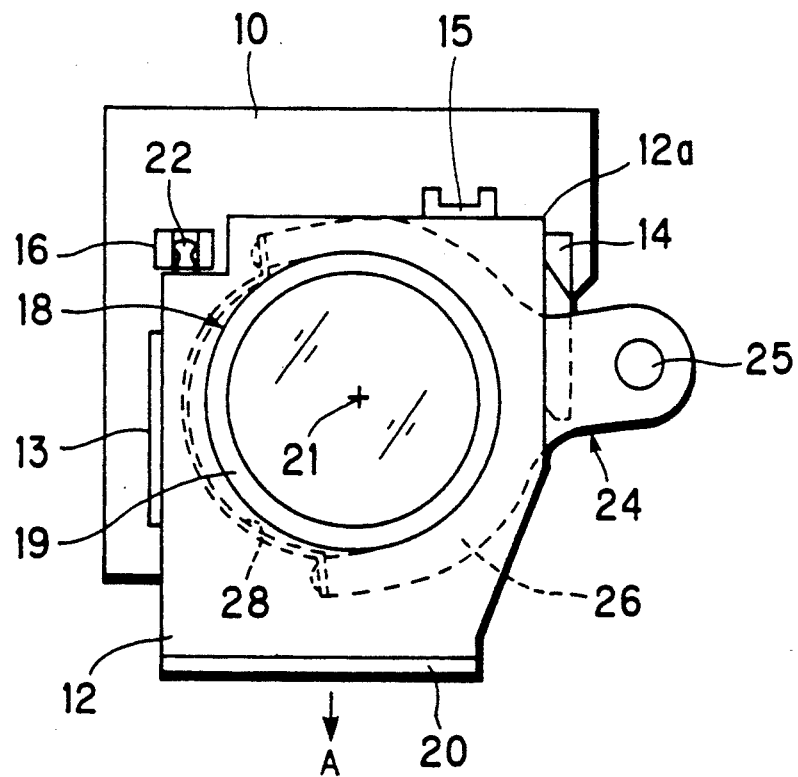
FIG. 1 is a plane view of a printing lens shift device according to an embodiment of the present invention, showing a zoom lens set position.
Figure 2:
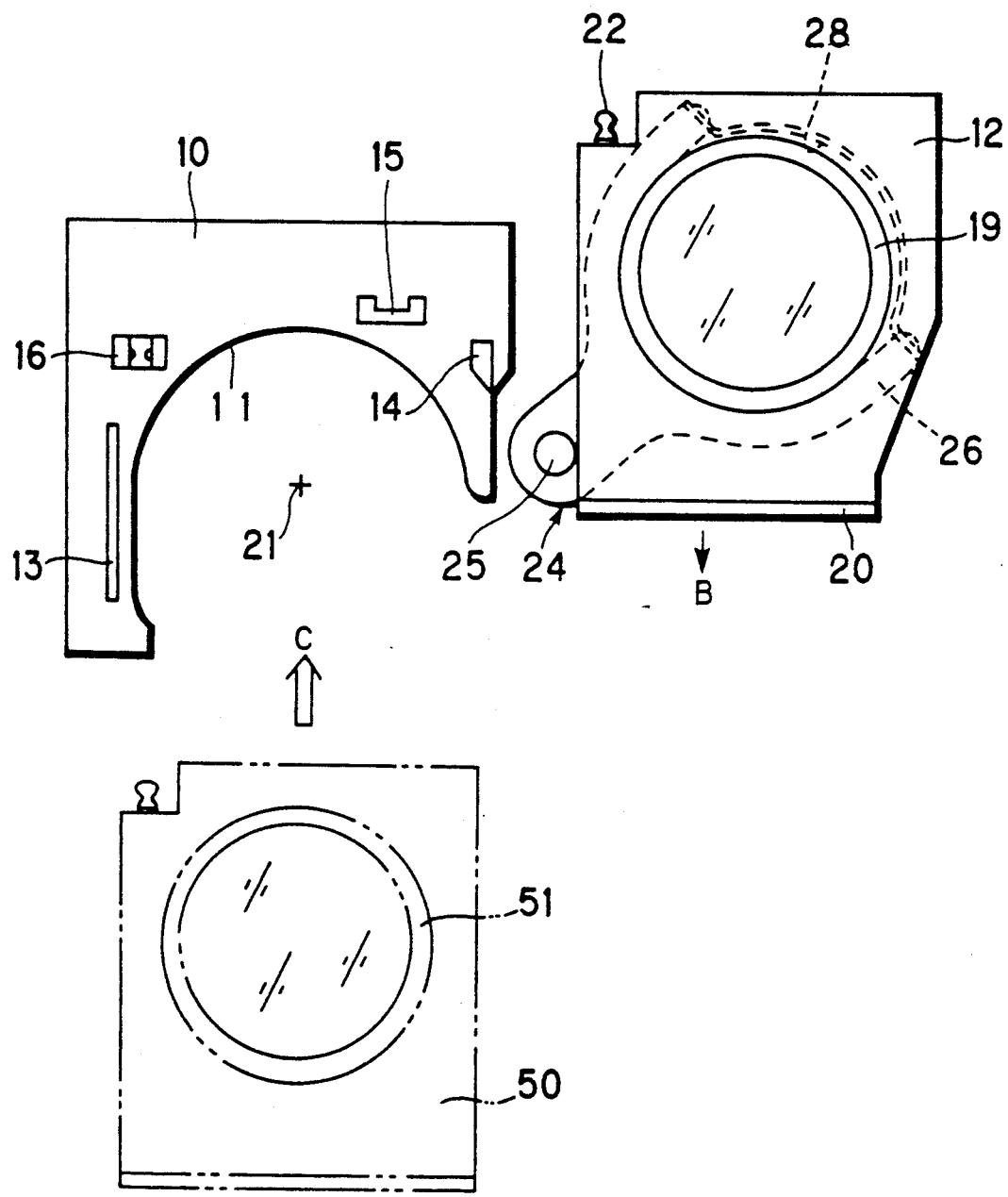
FIG. 2 is a plane view of the printing lens shift device, showing a zoom lens rest position.

FIGS. 1 and 2 show a lens set position and a lens rest position of a zoom lens, respectively. A lens deck 10 is secured to a photographic printer (not shown), and is formed with an arched lens support surface 11. The lens deck 10 is provided with guide members 13 and 14 for guiding a lens board 12, a stopper 15 for stopping the lens board 12 when the lens board 12 is placed on the lens deck 10. The lens deck 10 also has a click stop mechanism 16 for securing the lens board 12 to the lens deck 10.

The lens board 12 is of a substantially rectangular shape, and is secured to an outer periphery of a lens barrel 19 of a zoom lens 18. A lug 20 is formed on one edge of the lens board 12, opposite to the lens support surface 11 of the lens deck 10. The lug 20 is formed, for example, by bending one edge of the lens board 12 upwardly. The lug 20 may also be formed by bending the edge downwardly, or by cutting out a slit along the edge. A printing light path 21 and a click pin 22 are also illustrated.

Figure 3:
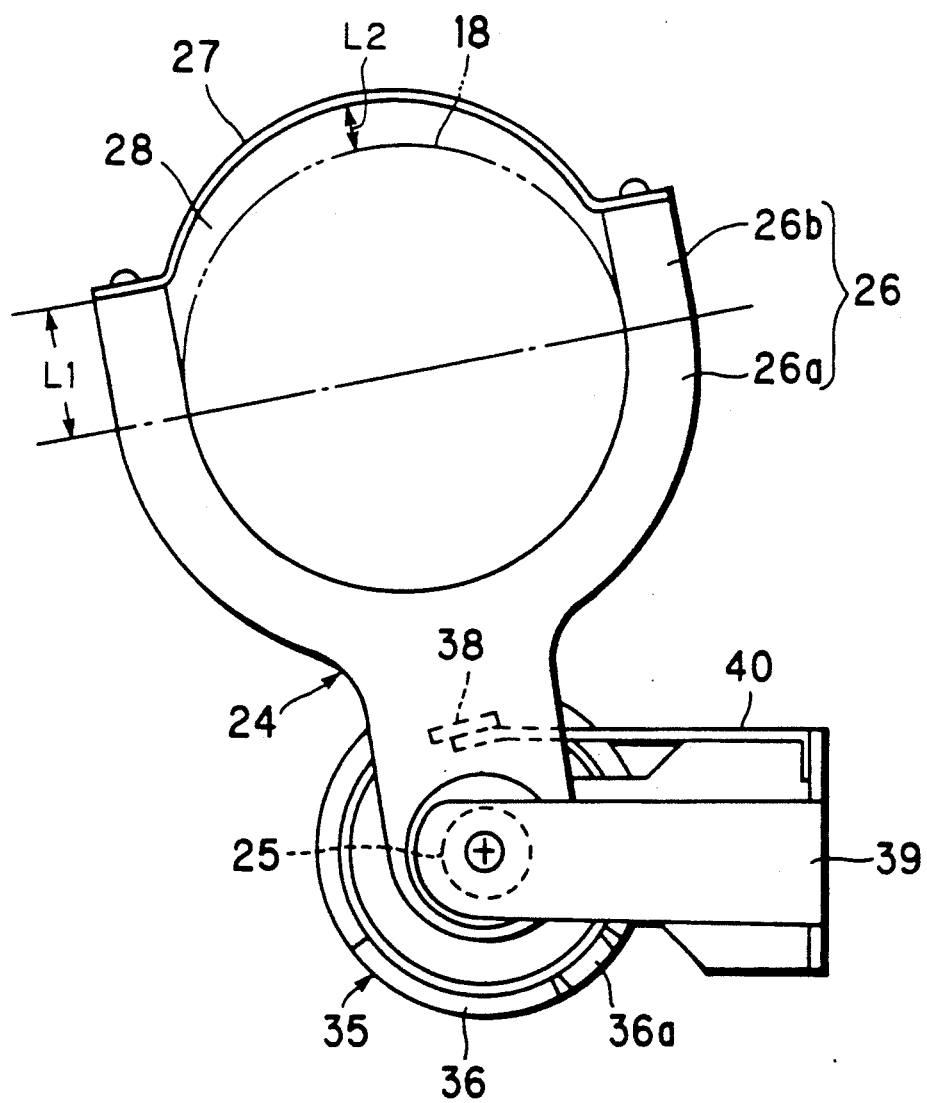
FIG. 3 is a plane view of a lens holder of the printing lens shift device.

A lens holder 24 is pivotally mounted on an axle 25, and is movable up and down along the axle 25. A free end of the lens holder 24 is shaped as a fork 26. As shown in FIG. 3, the fork 26 consists of a semi-circular portion 26a and straight portions 26b which extend by a length L1 from both ends of the semi-circular portion 26a. A semi-circular metal holder 27 is secured at its both ends to the ends of the straight portions 26b. As a result, the fork 26 and the metal holder 27 form an oval aperture 28 having a lengthwise diameter which is longer than a widthwise diameter by a length L2.

Figure 4:
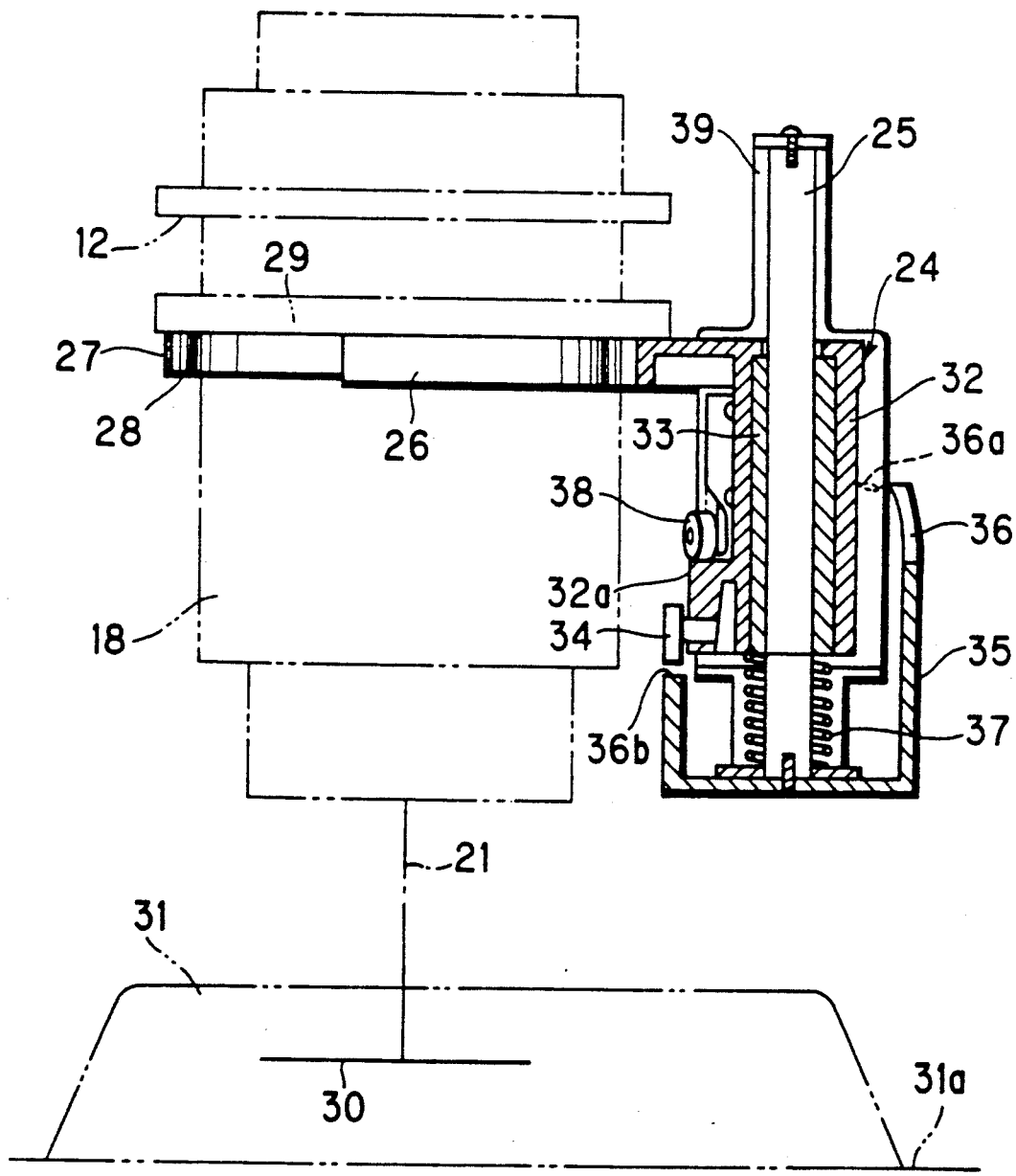
FIG. 4 is a vertical section of the lens holder placed in the zoom lens set position.

The zoom lens 18 is rotatably and slidably fitted in the oval aperture 28. As shown in FIG. 4, a flange 29 is formed on the lens barrel 19, which is adapted to rest on the fork 26. In this way, the zoom lens 18 is prevented from slipping down through the oval aperture 28.

Figure 5:
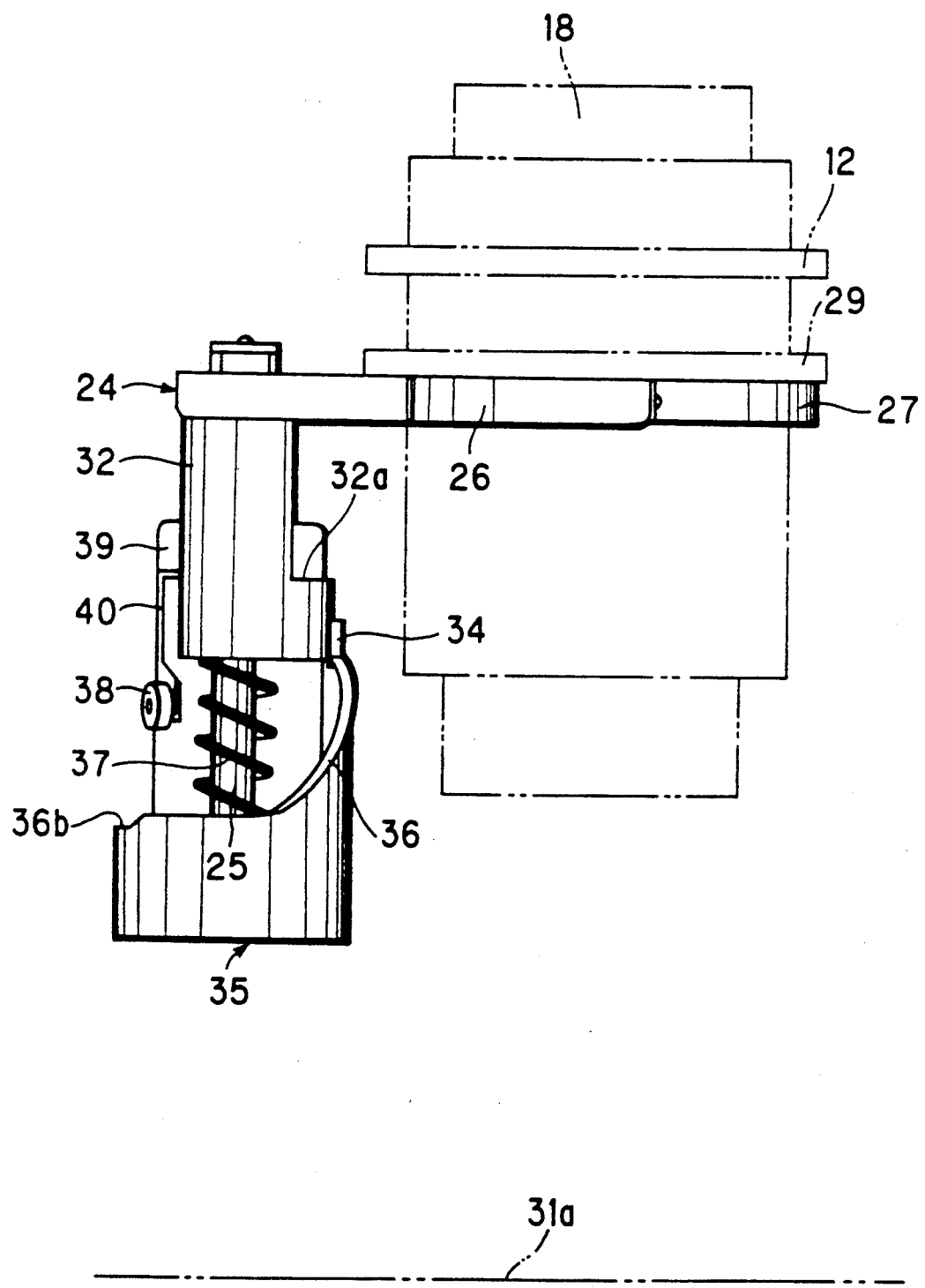
FIG. 5 is an elevational front view of the lens holder placed in the zoom lens rest position.
Figure 6:
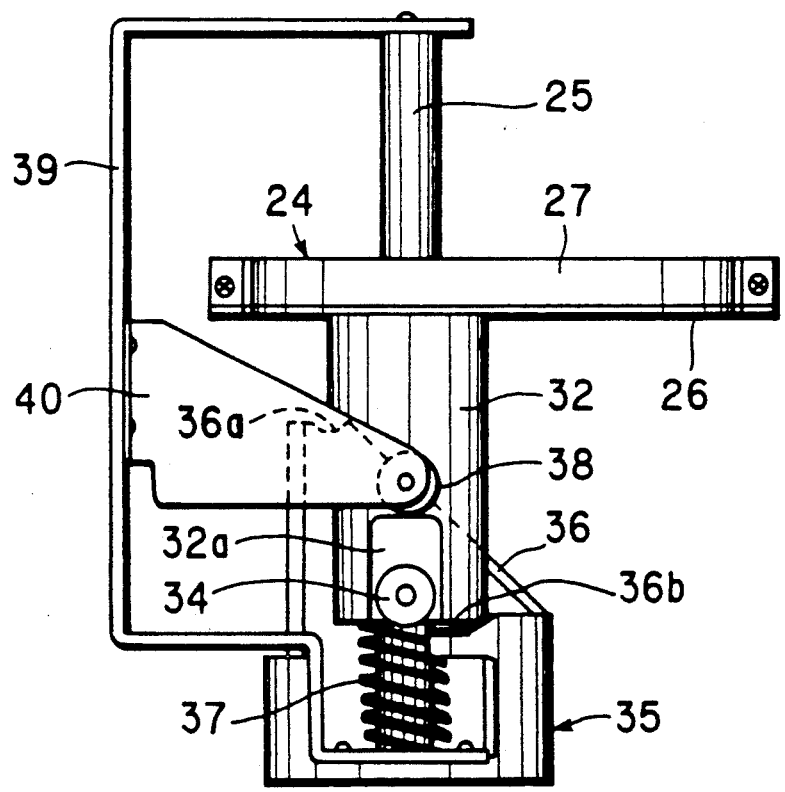
FIG. 6 is an elevational view of the lens holder placed in the zoom lens set position, viewed from right side of FIG. 5.

As shown in FIGS. 4 to 6, the lens holder 24 has a sleeve 32 which is rotatably fitted on the axle 25 through a bushing 33, and is movable up and down along the axle 25. In the zoom lens set position shown in FIG. 4, the zoom lens 18 is close to a film carrier 31 holding photographic film 30, so as to make the back focus as short as possible. If the narrow spacing between the zoom lens 18 and the film carrier 31 were unchanged when the zoom lens 18 is moved into the zoom lens rest position shown in FIG. 2, it would be difficult to handle the photographic film 30.

For this reason, the lens holder 24 is adapted to move upward while rotating from the zoom lens set position to the rest position, so that the zoom lens in the rest position is spaced apart from a table 31a of the film carrier 31. Particularly, a roller 34 is attached to the sleeve 32 of the lens holder 24. The roller 3 rotates along a cam surface 36 of a cam member 35, with the rotational movement of the lens holder 24.

In order to compensate for the weight of the zoom lens 18 and thus facilitate the upward movement of the lens holder 24, a balancing spring 37 is disposed to bias the sleeve 32 upward. Furthermore, the cam surface 36 has recess 36a formed proximate the upper end thereof, into which the roller 36 is trapped when the lens holder 24 is moved into the rest position, so as to stably hold the lens holder 24 in the rest position.

Because the zoom lens set position corresponds to the lower end of the cam surface 36, the roller 36 tends to lose contact with the cam surface 36, due to the force of the spring 37, when the lens is in the set position. If the roller 36 should do so, the axial position of the zoom lens 18 in the set position would be unstable, and the printed image would not be sharp. Therefore, the lens holder 24 is depressed downward against the spring 37 in the zoom lens set position, so as to fix the axial position of the zoom lens 18. Particularly, the sleeve 32 is formed with a shoulder 32a, which is pushed under a stationary roller 38 when the lens holder 24 is in the zoom lens set position. So as to provide a play between the movable roller 34 and the cam surface 36 when the lens holder 24 is pushed under the stationary roller 38, a cut-out 36b is formed proximate the lower end of the cam surface 36.

As shown in FIG. 6, the axle 25 is supported by a supporting plate 39, and the stationary roller 38 is secured to a supporting arm 40. When printing 135 film or smaller size films, the zoom lens 18 is placed in the set position shown in FIGS. 1 and 4. The focal length of the zoom lens 18 is adjusted to the frame size to be printed. When printing large size films, such as 120 film, the zoom lens 18 is exchanged with a fixed focus lens.

In order to change the lenses, the lens holder 12 is gripped at the lug 20 and is pulled straight in a direction shown by an arrow A. Accordingly, the click pin 22 of the lens board 12 is disengaged from the click mechanism 16. While the lens board 12 is pulled straight away from the lens deck 10, the lens holder 24 pivots about the axle 25, and the zoom lens 18 slides within the oval aperture 28, such that the direction of the motion of lens board 12 does not change, as shown in FIG. 1. In other words, the lens board 12 travels in a straight line. Therefore, removal of the lens board 12 from the lens deck 10 is easier than if the lens board 12 would rotate with the lens holder 24.

When the lens board 12 has been pulled to its extreme position in the direction A, a corner 12a of the lens board 12 has passed by the guide member 14 (see FIG. 1). Furthermore, the shoulder 32a of the sleeve 32 is no longer engaged with the stationary roller 38, and the movable roller 34 rides on the cam surface 36. Then, the lens board 12 is pushed sideways while maintaining the same orientation shown in FIG. 1. Thereby, the lens holder 24 pivots about the axle 25, while the zoom lens 18 rotates in the oval aperture 28.

As the lens holder 24 pivots, the roller 34 rotates along the cam surface 36 toward the rest position. Because the cam surface 36 has a slope, the lens holder 24 moves upward while pivoting toward the rest position. The upward movement of the lens holder 24 can be accomplished by applying only small force, due to the balancing spring 37 which urges the lens holder 24 upward against the weight of the zoom lens 18.

When the lens holder 24 reaches the rest position as shown in FIGS. 2 and 5, the roller 34 is trapped in the recess 36a, thereby holding the zoom lens 18 stably in the rest position. After the zoom lens 18 is placed in the rest position, a fixed focus lens 51 having a focal length corresponding to the frame size to be printed is selected and placed in the lens deck 10 by horizontally sliding a second lens board 50 of the fixed focus lens 51 into the lens deck 10, as shown by an arrow C (see FIG. 2). Because the zoom lens 18 is moved upward so as to provide a large space between the zoom lens 18 and the table 31a, handling of photographic film on the film carrier 31 is facilitated.

In order to print the small size film again, the fixed focus lens is removed from the lens deck 10 by pulling the fixed focus lens from the lens deck 10 in a straight line direction reverse to the direction C. Next, the lug 20 is grasped so as to pull the lens board 12 in a straight line direction shown by an arrow B. As a result, the lens holder 24 pivots about the axle 25 and moves downward, while the lens board 12 maintains the orientation shown in FIG. 2. When the lens board 12 moves into the front of the lens deck 10, it is then pushed straight toward the lens deck 10 until the lens board 12 strikes against the stopper 15 after being guided along the guide members 13 and 14. Meanwhile, the zoom lens 18 not only moves along with the fork 26 of the lens holder 24, but also rotates and slides in the oval aperture 28.

When the lens board 12 is pushed straight toward the lens deck 10, the shoulder 32a is pushed under the stationary roller 34. Simultaneously, the movable roller 34 leaves the cam surface 36 due to the cut-out 36b. As a result, the lens holder 24 is moved slightly downward against the sprint 37. The axial position of the zoom lens 18 is fixed by engagement of the shoulder 32a with the stationary roller 38.

When the lens board 12 strikes against the stopper 15, the click pin 22 is brought into engagement with the click mechanism 16, so as to prevent inadvertent removal of the lens board 12 from the lens deck 10. The outer periphery of the lens barrel 19 of the zoom lens 18 contacts the lens support surface 11 of the lens deck 10.

Although the present invention has been described in detail above with reference to a preferred embodiment shown in the drawings, various modifications within the scope and spirit of the invention will be apparent to people of working skill in this technological field. For example, it is possible to attach a fixed focus lens to the lens holder 24, as a standard printing lens, which is specific to the printing of full size frames of 135 film.

Thus, the invention should be considered as limited only by the scope of the appended claims.

What is claimed is:

1. A lens shift device for a photographic printer comprising:
   a lens holder pivotally mounted on an axle so as to rotate between a first position and a second position;
   an oval aperture formed in said lens holder; and
   a first printing lens fitted in said oval aperture in rotatable and horizontally slidable fashion;
   said first position corresponding to a lens set position where said first printing lens is placed in a printing light path, and said second position corresponding to a lens rest position where said first printing lens is displaced from said printing light path means for guiding said first printing lens in a linear direction when said first printing lens is proximate said lens set position.

2. A lens shift device as recited in claim 1, further comprising:
   a lens board secured to said first printing lens; and
   a lens deck engaged with said lens board so as to guide and position said lens board;
   said lens deck having a semi-circular recess formed in a front edge thereof;
   said first printing lens being fitted in said recess when said lens board is pushed toward said lens deck in said linear direction, and is removed from said recess when said lens board is pulled away from said lens deck in said linear direction.

3. A lens shift device as recited in claim 2, further comprising an engagement mechanism coupled to said lens board and said lens deck to anchor said lens board to said lens deck so as to fix said first printing lens in said lens set position.

4. A lens shift device as recited in claim 2, wherein said lens board is formed with a lug protruding therefrom.

5. A lens shift device as recited in claim 2, further comprising:
   first means for moving said lens holder upward along said axle while said lens holder is pivoting about said axle from said lens set position to said lens rest position.

6. A lens shift device as recited in claim 5, wherein said lens holder has a sleeve in one end thereof and a fork in the other end thereof, said sleeve being rotatably fitted on said axle, and said fork forming at least a part of said oval aperture.

7. A lens shift device as recited in claim 6, wherein said oval aperture is formed by an arched edge of said fork and an arched edge of a holding member which is secured at its ends to front ends of said fork.

8. A lens shift device as recited in claim 7, wherein said first means includes a roller secured to said sleeve of said lens holder, and a cam surface having a slope, along which said roller rotates to move said sleeve upward while said lens holder moves from said lens set position to said lens rest position.

9. A lens shift device as recited in claim 8, wherein said sleeve is urged by a spring to move upward; so as to compensate for a weight of said first printing lens.

10. A lens shift device as recited in claim 9, further comprising means for depressing said sleeve downward when said lens holder is placed in said lens set position, so as to fix an axial position of said first printing lens.

11. A lens shift device as recited in claim 10, wherein said depressing means includes a second stationary roller disposed in a predetermined position, and a shoulder formed on said sleeve, said shoulder being inserted under said roller when said lens holder is in said lens set position.

12. A lens shift device as recited in claim 9, wherein, said first printing lens is a zoom lens.

13. A lens shift device as recited in claim 12, wherein said lens deck can hold a second printing lens when said lens holder of said first printing end is moved in said lens rest position.

* * * * *